United States Patent
Deleris et al.

(10) Patent No.: US 10,762,297 B2
(45) Date of Patent: Sep. 1, 2020

(54) SEMANTIC HIERARCHICAL GROUPING OF TEXT FRAGMENTS

(71) Applicant: INTERNATIONAL BUSINESS MACHINES CORPORATION, Armonk, NY (US)

(72) Inventors: Lea A. Deleris, Paris (FR); Yassine Lassoued, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 231 days.

(21) Appl. No.: 15/247,005

(22) Filed: Aug. 25, 2016

(65) Prior Publication Data

US 2018/0060305 A1 Mar. 1, 2018

(51) Int. Cl.
| | |
|---|---|
| G06F 40/30 | (2020.01) |
| G06F 7/02 | (2006.01) |
| G06F 16/36 | (2019.01) |
| G06F 40/247 | (2020.01) |
| G06F 40/284 | (2020.01) |

(52) U.S. Cl.
CPC ........... *G06F 40/30* (2020.01); *G06F 7/02* (2013.01); *G06F 16/36* (2019.01); *G06F 16/367* (2019.01); *G06F 40/247* (2020.01); *G06F 40/284* (2020.01)

(58) Field of Classification Search
CPC .......... G06F 17/30598; G06F 17/2785; G06F 17/30705; G06F 17/30684; G06F 17/30011
USPC ........................................................ 707/739
See application file for complete search history.

(56) References Cited

U.S. PATENT DOCUMENTS

| | | | |
|---|---|---|---|
| 7,774,198 B2 | 8/2010 | Roulland et al. | |
| 8,666,730 B2 | 3/2014 | Todhunter et al. | |
| 9,286,886 B2 | 3/2016 | Minnis et al. | |
| 2013/0268260 A1* | 10/2013 | Lundberg | G06F 17/28 704/8 |
| 2015/0039611 A1* | 2/2015 | Deshpande | G06F 17/30598 707/737 |
| 2015/0178345 A1* | 6/2015 | Carrier | G06F 17/28 707/691 |
| 2016/0012336 A1* | 1/2016 | Franceschini | G06N 5/025 706/55 |

(Continued)

OTHER PUBLICATIONS

IBM, "A mechanism for collecting and publishing the information from emails, text fragments, doc fragments, tips, web page fragments on a knowledge base server," an IP.com Prior Art Database Technical Disclosure, IP.com No. IPCOM000181695D, Apr. 9, 2009 (4 pages).

(Continued)

*Primary Examiner* — Hosain T Alam
*Assistant Examiner* — Nicholas E Allen
(74) *Attorney, Agent, or Firm* — Griffiths & Seaton PLLC

(57) ABSTRACT

Embodiments for semantic hierarchical grouping of short text fragments by a processor. Sub-terms are extracted from a plurality of input text fragments according to a lexical sub-term hierarchy. Each of the sub-terms in the lexical sub-term hierarchy are matched with concepts based on an ontology of concepts representing a domain knowledge. The input text fragments are automatically grouped into a hierarchy of concepts based on the matching and a semantical relationship between each concept and matching sub-term.

15 Claims, 14 Drawing Sheets

(56) References Cited

U.S. PATENT DOCUMENTS

| | | | |
|---|---|---|---|
| 2016/0132484 A1* | 5/2016 | Nauze | G06F 16/367 |
| | | | 704/9 |
| 2016/0147736 A1* | 5/2016 | Danielyan | G06F 17/2785 |
| | | | 704/9 |
| 2016/0179945 A1* | 6/2016 | Lastra Diaz | G06F 17/30734 |
| | | | 707/739 |
| 2016/0224542 A1* | 8/2016 | Bulgakov | G06F 17/2785 |

OTHER PUBLICATIONS

Anonymous, "A System for Segment Retrieval in Web Content," an IP.com Prior Art Database Technical Disclosure, IP.com No. IPCOM000198573D, Aug. 9, 2010 (5 pages).

* cited by examiner

TERM TO CONCEPT MATCHING

"BODY SIZE, MEASURED AS BODY MASS INDEX"

"BODY SIZE":C0005901(BODY SIZE)^[1.0]
    "BODY":C0152338(BCd)^[1.0], C0242821(BODIES, HUMAN)^[1.0], C0460148 (BODY)^[1.0]...
    "SIZE":C0221872 (SIZERS)^[1.0], C0456389 (025-026 SIZES)^[1.0] C0522511 (HAS SIZE)^[1.0]...
"MEASURED":C044703 (MEASURED)^[1.0], C0449768 (MEASURED TO)^[1.0], C3641261 (NOT MEASURED)^[1.0]...
"BODY MASS INDEX": C0005893 (BMI)^[1.0], C1305855 (BMI)^[1.0], C2240399 (BODY MASS INDEX)^[1.0]
    "BODY MASS": C0518010 (BODY MASS)^[1.0]
        "BODY": C0152338 (BDd)^[1.0], C0242821 (BODIES, HUMAN)^[1.0], C0460148 (BODY)^[1.0]...
        "MASS": C0577559 (A MASS)^[1.0], C1306372 (*MASS)^[1.0], C1414542 (FBN)^[1.0], C1546709 (MASS)^[1.0]...
    "INDEX": C0021200 (INDEXING)^[1.0], C0600653 (INDEXES)^[1.0], C0918012 (INDEX)^[1.0]...

FIG. 10

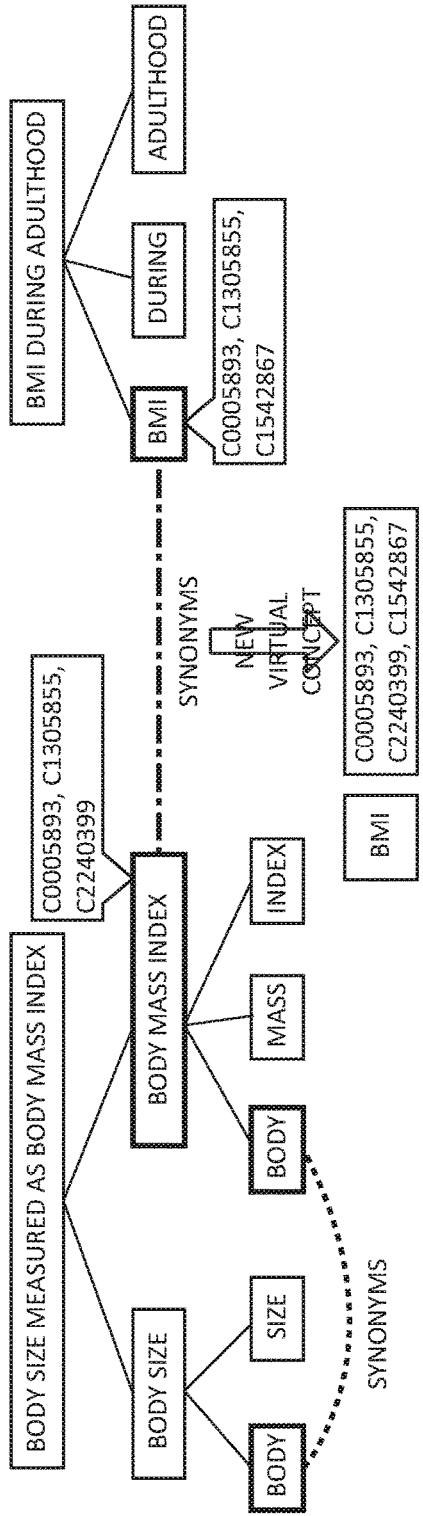

SYNONYMY FUSION

FIG. 11

SEMANTIC HIERARCHICAL GROUPING OF TEXT FRAGMENTS

BACKGROUND OF THE INVENTION

Field of the Invention

The present invention relates in general to computing systems, and more particularly to, various embodiments for semantic hierarchical grouping of text fragments using a computing processor.

Description of the Related Art

Computing systems may be found in the workplace, at home, or at school. Computer systems may include data storage systems, or disk storage systems, to process and store data. Large amounts of data have to be processed daily and the current trend suggests that these amounts will continue being ever-increasing in the foreseeable future. Due to the recent advancement of information technology and the growing popularity of the Internet, a vast amount of information is now available in digital form. Such availability of information has provided many opportunities. Digital and online information is an advantageous source of business intelligence that is crucial to an entities survival and adaptability in a highly competitive environment.

SUMMARY OF THE INVENTION

Various embodiments for semantic hierarchical grouping of text fragments by a processor, are provided. In one embodiment, by way of example only, a method for semantic hierarchical grouping of text fragments, again by a processor, is provided. Sub-terms are extracted from a plurality of input terms according to a lexical sub-term hierarchy. Each of the sub-terms in the lexical sub-term hierarchy is matched with concepts based on an ontology of concepts representing a domain knowledge. The sub-terms are automatically grouped into a hierarchy of concepts based on the matching and a semantical relationship between each concept and matching sub-term.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 10 is a diagram depicting an exemplary term to concept matching with an associated score in accordance with aspects of the present invention;

FIG. 11 is a diagram depicting synonymy fusion across all sub-term lexical hierarchies for semantic hierarchical grouping in accordance with aspects of the present invention;

DETAILED DESCRIPTION OF THE DRAWINGS

Figure 1:
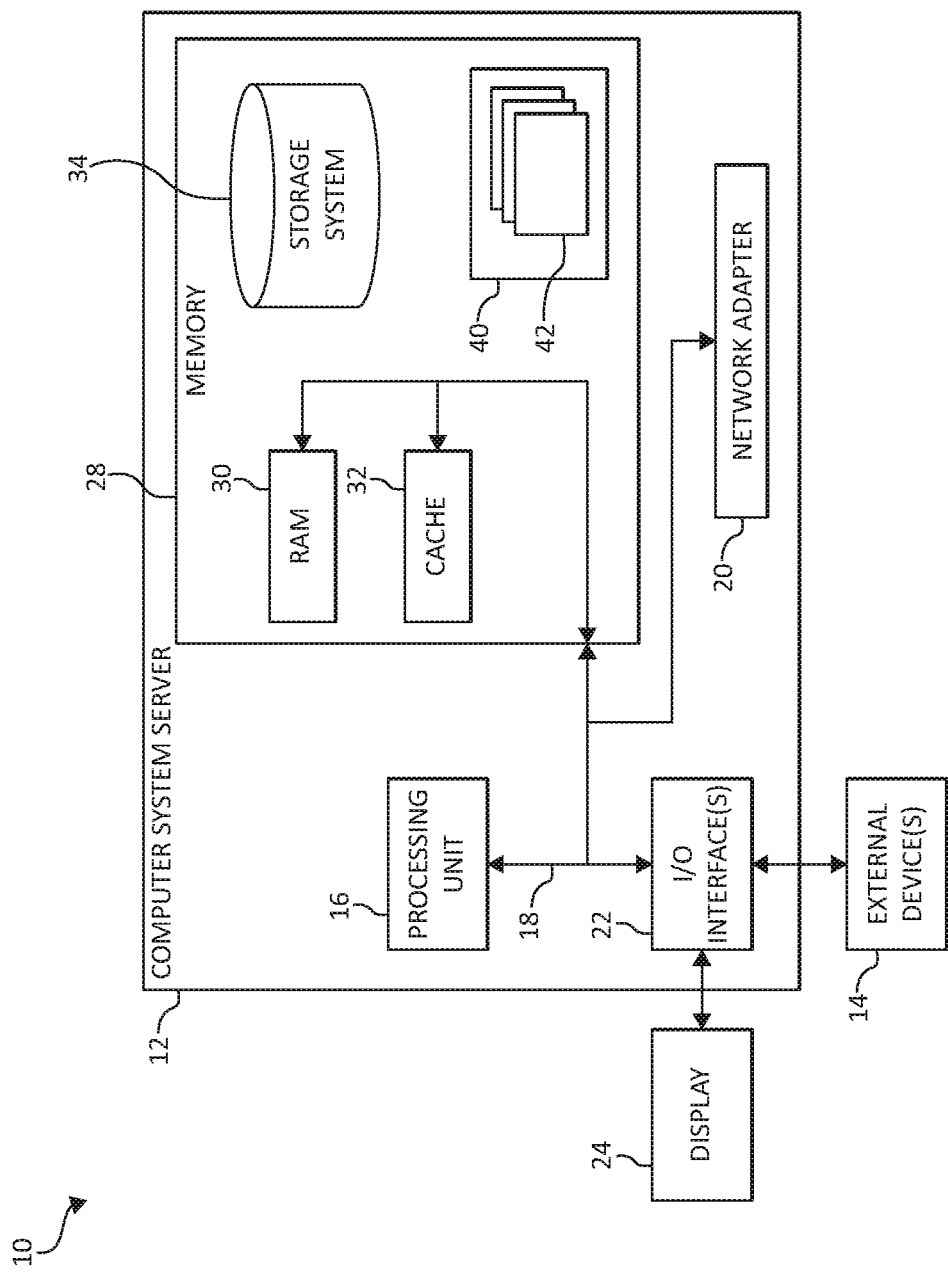
FIG. 1 is a block diagram depicting an exemplary cloud computing node according to an embodiment of the present invention.

As the amount of electronic information continues to increase, the demand for sophisticated information access systems also grows. Digital or "online" data has become increasingly accessible through real-time, global computer networks. The data may reflect many aspects of the behavior of groups or individuals in a population, including scientific, educational, financial, travel, traffic flow, shopping and leisure activities, healthcare, and so forth. Many data-intensive applications require the extraction of information from data sources, such as, for example, within the healthcare environment. The extraction of information may be obtained through a knowledge generation process that may include initial data collection among different sources, data normalization and aggregation, and final data extraction. For example, within the healthcare industry, research is moving towards leveraging the medical literature for automated discovery, part of which is based on the automatic extraction of relationships and interactions amongst diseases, risk factors, drugs, genes, etc. from natural text.

As such, there is a need to accurately identify synonymous or closely related terms and group the synonymous or closely related terms under an appropriate concept of a domain knowledge. In some aspects, while the output of information extraction tasks is, as intended, structured (e.g., tabular, graph triples, etc.), the extracted information (e.g., field values, graph nodes, etc.) may still be free text values.

As such, the extracted information may contain multiple representations of similar or related concepts. This makes it difficult to further leverage the extracted knowledge as is (for instance for aggregation purposes).

The mechanisms of the illustrated embodiments provide a system that may receive a collection of text fragments (e.g., terms or bigrams or even longer phrases of a dozen terms) from input terms. The text fragments may be automatically grouped and organized into a hierarchy of concepts based on a provided thesaurus of concepts representing the domain knowledge. A semantic relationship may be identified between the concepts and the short text fragments. A recipient (e.g., a user or administrator) may be provided the ability via a graphical user interface (GUI) to validate and correct the hierarchy of concepts match to terms generated by the system. In one aspect, a final user-validated hierarchy of concepts can then be leveraged to compute similarity or distance between text fragments while simultaneously clustering text fragments together.

As will be further described, in various embodiments, the mechanisms of the present invention may extract sub-terms from a plurality of input text fragments according to a lexical sub-term hierarchy. Each of the sub-terms in the lexical sub-term hierarchy may be matched with concepts based on an ontology of concepts representing a domain knowledge. The sub-terms may be automatically grouped into a hierarchy of concepts based on the sub-term to concept matches, the lexical hierarchical relationships, and the semantic relationships between the concepts.

In one aspect, a thesaurus or ontology as the domain knowledge may be used for the lexical sub-term hierarchy and hierarchy of concepts creation where the hierarchy of concepts is a hierarchy of concepts and terms. The thesaurus and ontology may also be used to identify semantic relationships between the sub-terms and related concepts.

In one aspect, the term "domain" is a term intended to have its ordinary meaning. In addition, the term "domain" can include an area of expertise for a system or a collection of material, information, content and/or other resources related to a particular subject or subjects. For example, a domain can refer to financial, healthcare, advertising, commerce, scientific, industrial, educational, medical and/or biomedical-specific information. A domain can refer to information related to any particular subject matter or a combination of selected subjects.

The term ontology is also a term intended to have its ordinary meaning. In one aspect, the term ontology in its broadest sense may include anything that can modeled as ontology, including but not limited to, taxonomies, thesauri, vocabularies, and the like. For example, an ontology may include information or content relevant to a domain of interest or content of a particular class or concept. Content can be any searchable information, for example, information distributed over a computer-accessible network, such as the Internet. A concept can generally be classified into any of a number of concepts which may also include one or more sub-concepts. Examples of concepts may include, but are not limited to, scientific information, healthcare information, medical information, biomedical information, business information, educational information, commerce information, financial information, pricing information, information about individual people, cultures, groups, sociological groups, market interest groups, institutions, universities, governments, teams, or any other information group. The ontology can be continuously updated with the information synchronized with the sources, adding information from the sources to the ontology as models, attributes of models, or associations between models within the ontology.

The mechanisms of the present invention may group short text fragments under a hierarchy of concepts using domain knowledge, by identifying most similar and relevant matching concepts for each input text fragment according to the domain knowledge and/or semantic similarities. In one aspect, the domain knowledge may be represented as an ontology (e.g., thesaurus, taxonomy, etc.) with one or more semantic types listed for and/or associated with the concepts. A lexical hierarchy of sub-terms for each input term may be created. A lexical hierarchical relationship between sub-terms may be used for enriching the semantic relationships between concepts, as defined in the domain knowledge. The domain knowledge may be searched and queried to identify the semantic relationship between concepts while mapping and matching terms or sub-terms to concepts. Using the domain knowledge, the most relevant concepts matching the sub-terms may be included in a hierarchy of concepts and terms that may be created. In one aspect, relevancy may be according to semantic similarities, semantic types, and/or categories associated with the concepts and/or text fragments. In one aspect, the hierarchy of concepts (e.g. a graph) may include nodes of the graph representing the concepts from the domain knowledge with relevant sub-terms from the input text fragments and/or and the input text fragments them-selves as the leaves of the nodes. The hierarchy of concepts may be edited, validated, and/or corrected (moving nodes and leaves of the nodes). The hierarchy can also be used as guidance for clustering approach, enabling the user to select a level at which the actual terms grouping will be performed.

In this way, the mechanisms of the present embodiment enables not only clustering of terms based on their similarity, but also clustering the terms centered around a concept of a domain knowledge, which may be of interest to the user and may be edited, corrected, and validated by the user.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
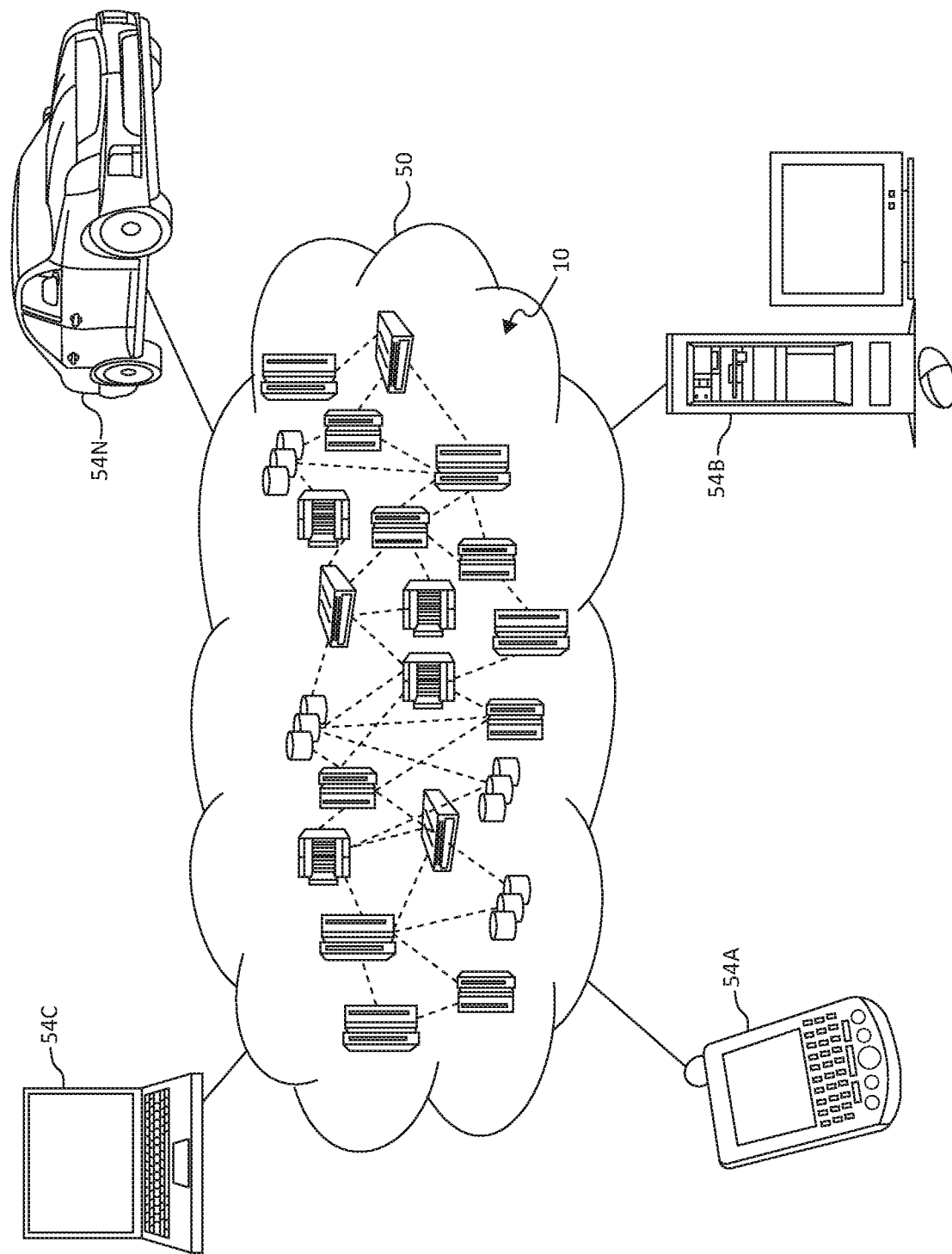
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
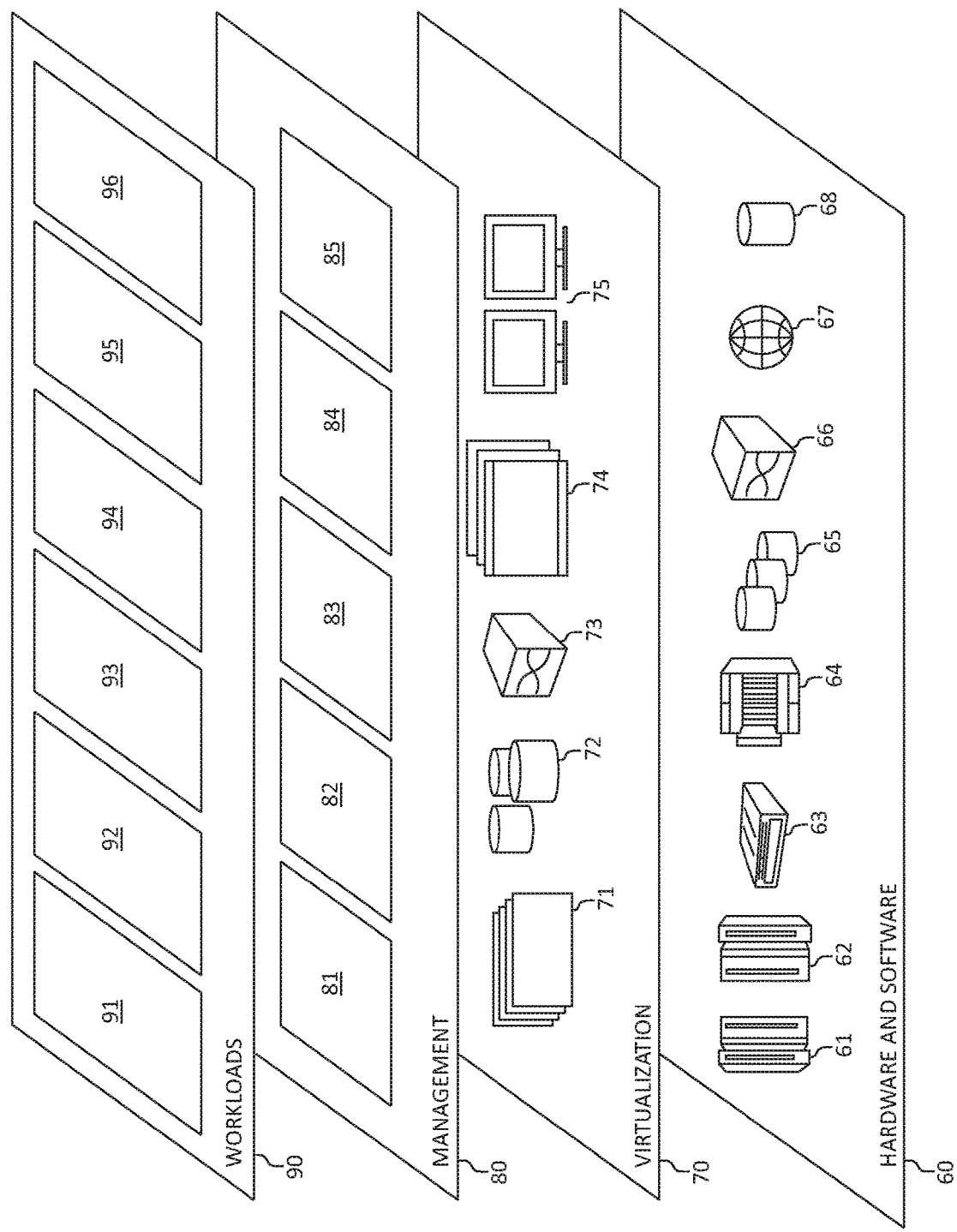
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various semantic hierarchical grouping processing workloads and functions 95. In addition, semantic hierarchical grouping processing workloads and functions 95 may include such operations as text and concept matching and hierarchy concept creation, and as will be further described, user and device management functions. One of ordinary skill in the art will appreciate that the semantic hierarchical group processing workloads and functions 95 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Next, the mechanisms of the illustrated embodiments include methodologies for semantic hierarchical grouping of text fragments with matching concepts by a processor. Sub-terms are extracted from a plurality of input terms according to a lexical sub-term hierarchy. Each of the sub-terms in the lexical sub-term hierarchy are matched with concepts based on an ontology of concepts representing a domain knowledge. The sub-terms are automatically grouped into a hierarchy of concepts based on sub-term to concept matches, the lexical hierarchical relationships, and the semantic relationships between the concepts.

It should be noted that as described herein the mechanisms of the illustrated embodiments illustrate the domain knowledge of the "medical domain" for illustrative purposes only, but may also apply to any other domain knowledge. Thus, mechanisms of the illustrated embodiments may be implemented according to a domain knowledge of interest to a user.

Figure 4:
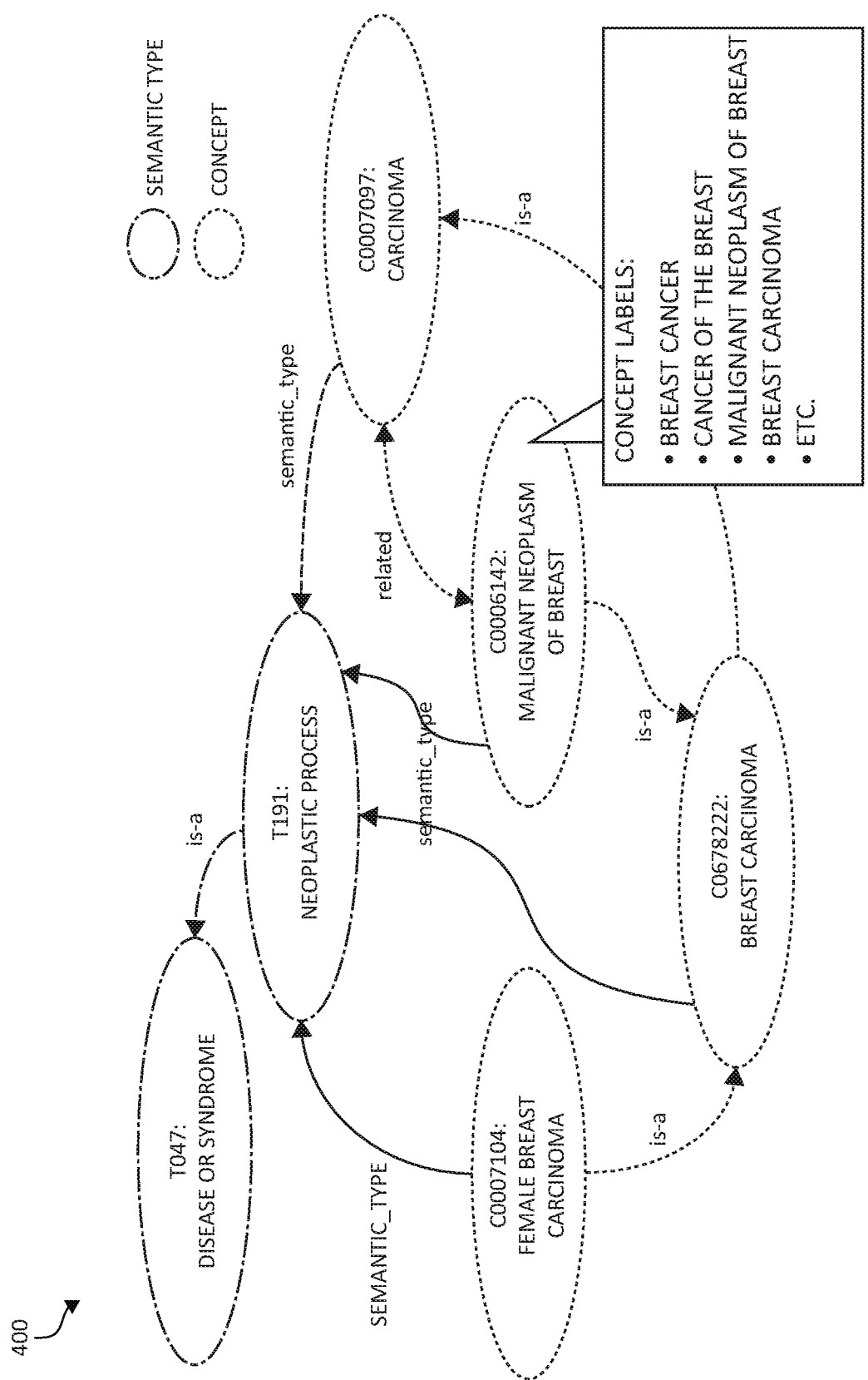
FIG. 4 is a diagram depicting various relationships amongst concepts and semantic types as can be found, for example, using a Unified Medical Language System (UMLS) Meta Thesaurus in accordance with aspects of the present invention.

FIG. 4 is an additional conceptual diagram depicting various concepts and semantic types and in accordance with aspects of the present invention. FIG. 4 depicts relationships amongst concepts and semantic types as can be found for instance in a Unified Medical Language System (UMLS) Meta Thesaurus. As described herein, for illustrative purpose only, arbitrary semantic type or concept values or identifiers (ID) may be assigned and/or used. Semantic types are groupings of concepts that share "something in common", for example, a semantic type may be "Neoplastic Process", which groups concepts such as "Breast Carcinoma" and "Carcinoma"; or "Food", which groups "Coffee", "Tea", "Strawberry", etc.

Consider the following example of an implementation of the aforementioned functionality. FIG. 4 depicts the labels "breast cancer", "cancer of the breast", "malignant neoplasm of breast", and "breast ca." associated with the concept C0006142 (Malignant Neoplasm of Breast). Concept Carcinoma (ID C0007097) has as semantic type Neoplastic Process (ID T191). Concept Female Breast Carcinoma (ID C0007104) has as semantic type Neoplastic Process (ID T191) and is specified as a narrower ("is-a" relationship) concept than Breast Carcinoma (ID C0678222). In the same way concept Breast carcinoma (ID C0678222) is narrower than Carcinoma (ID C0007097). The concept Malignant Neoplasm of the Breast (ID C0006142) is semantically related to concept Carcinoma (ID C0007097) and is narrower than (relationship is-a) concept Breast Carcinoma (ID C0678222).

Figure 5:
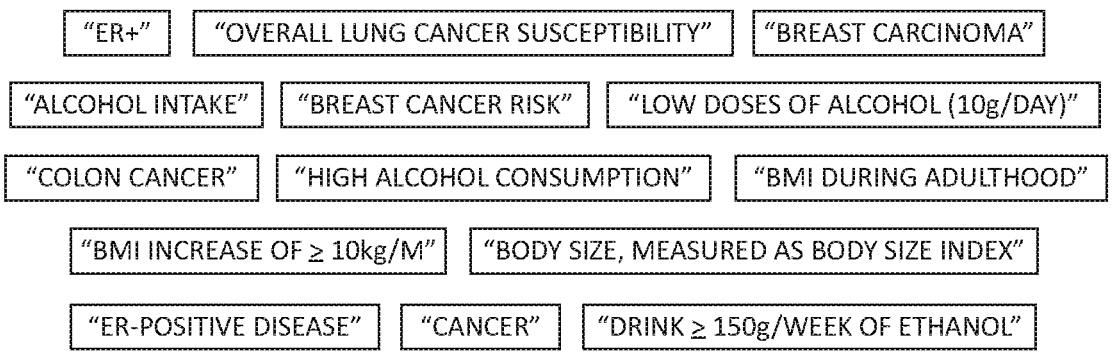
FIG. 5 is an additional diagram depicting an exemplary set of input text fragments in accordance with aspects of the present invention.

FIG. 5 is an additional diagram depicting an exemplary set of input text fragments 500 in accordance with aspects of the present invention. For example, by way of illustration purposes only, the exemplary text fragments may include, but not limited to: "ER+", "overall lung cancer susceptibility", "breast carcinoma", "alcohol intake", "breast cancer risk", "low doses of alcohol (10 g/day)", "colon cancer", "high alcohol consumption", "BMI during adulthood", "BMI increase of ≥10 kg/m", "body size, measured as body size index", "ER-positive disease", "cancer", and/or "drink ≥150 g/week of ethanol".

Figure 6:
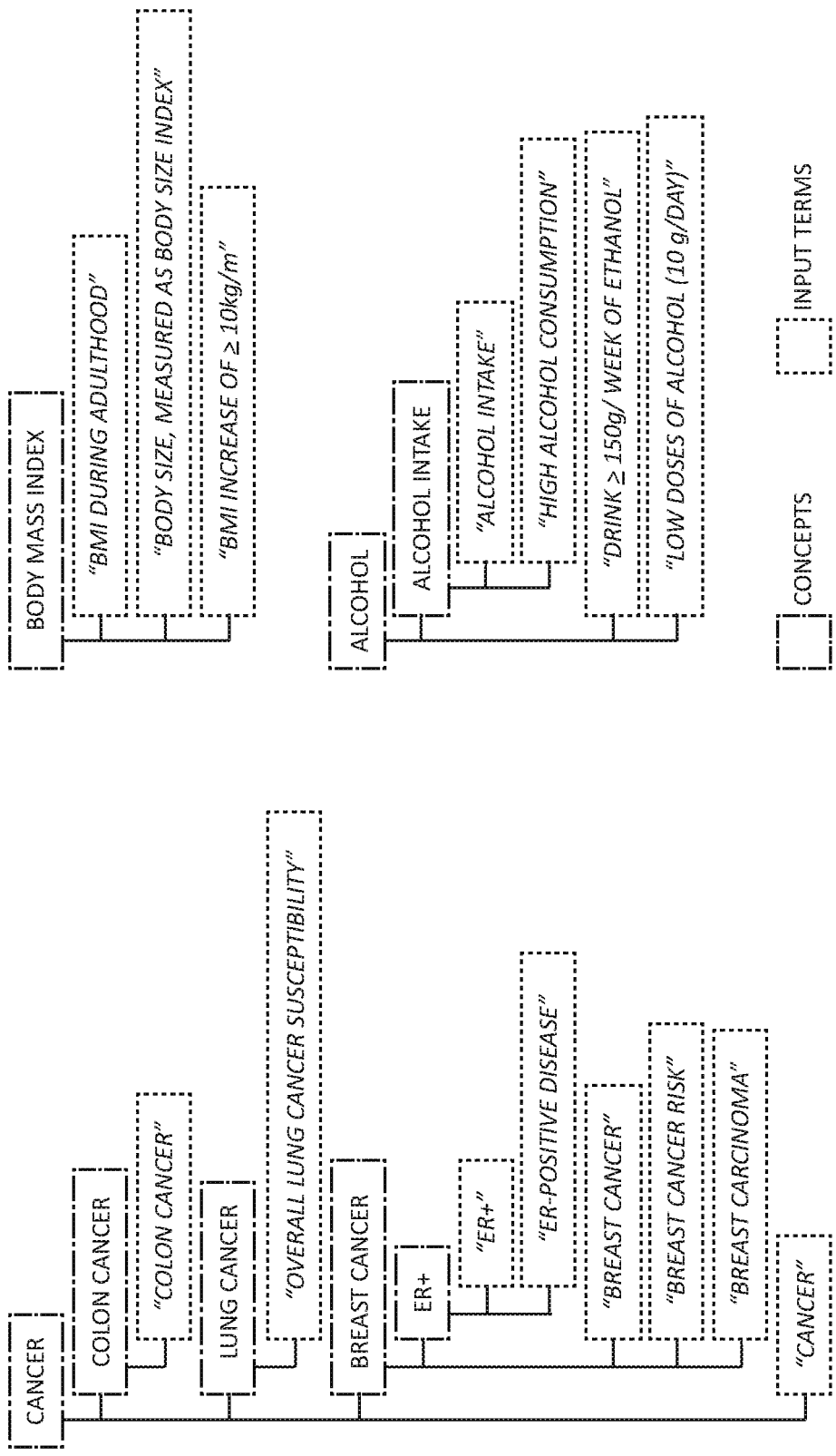
FIG. 6 is a conceptual diagram depicting an exemplary System Output: Concept-Term hierarchy in accordance with aspects of the present invention.

Turning now to FIG. 6, an exemplary output concept-term hierarchy 600 is depicted. The concept-term hierarchy is a hierarchy of the text fragments terms together with relevant domain concepts, organized based on their semantic and lexical relatedness. This constitute an example output from the application of the present invention. In creating the output concept-term hierarchy 600, each of the input terms in the hierarchy 600 may be matched with or mapped to concepts based on an ontology of concepts representing a domain knowledge. It should be noted that various concepts may be organized or categorized in the hierarchy of lexical sub-term hierarchy using the thesaurus and/or ontology.

For example, using the text fragments of FIG. 5 as input terms to create the output concept-term hierarchy 600, the concepts of "cancer", "lung cancer", "body mass index", and alcohol may each be the beginning (top-level) nodes of the output concept-term hierarchy 600. Colon cancer, lung cancer breast cancer and ER+ may each be a sub-concept or sub-nodes under the main concept of cancer in the output concept-term hierarchy 600. In a similar fashion, alcohol intake may be a sub-concept or sub-node under the main concept of alcohol in the output concept-term hierarchy 600. Using a thesaurus and/or ontology of concepts representing a domain knowledge, the input text fragments are matched with or mapped to concepts. For example, concept Colon Cancer is determined as a matching concept to the input text fragment "colon cancer". In like manner, concept of Lung Cancer is determined as a matching concept to the text fragment "overall lung cancer susceptibility". The sub-concept of ER+, which may be a sub-concept or sub-node of the sub-concept of Breast Cancer (which is also a sub-concept of the main concept Cancer) may be determined as a relevant matching concept to the input text fragments "ER+" and "ER-positive disease". The concept or sub-concept Breast Cancer may be determined as a relevant matching concept to the input text fragments "breast cancer", "breast cancer risk", and "breast carcinoma".

Furthermore, the concept of Body Mass Index may be determined as a matching concept to the input terms "BMI during adulthood", "body size, measured as body size index", and "BMI increase of ≥10 kg/m". The concept Alcohol Intake (which is also a sub-concept or sub-node of the concept Alcohol) may be determined as a matching concept to the input terms "alcohol intake" and "high alcohol consumption". The primary concept Alcohol may be determined as a matching concept to the input text fragments "drink ≥150 g/week of ethanol" and "low doses of alcohol (10 g/day)".

Figure 7:
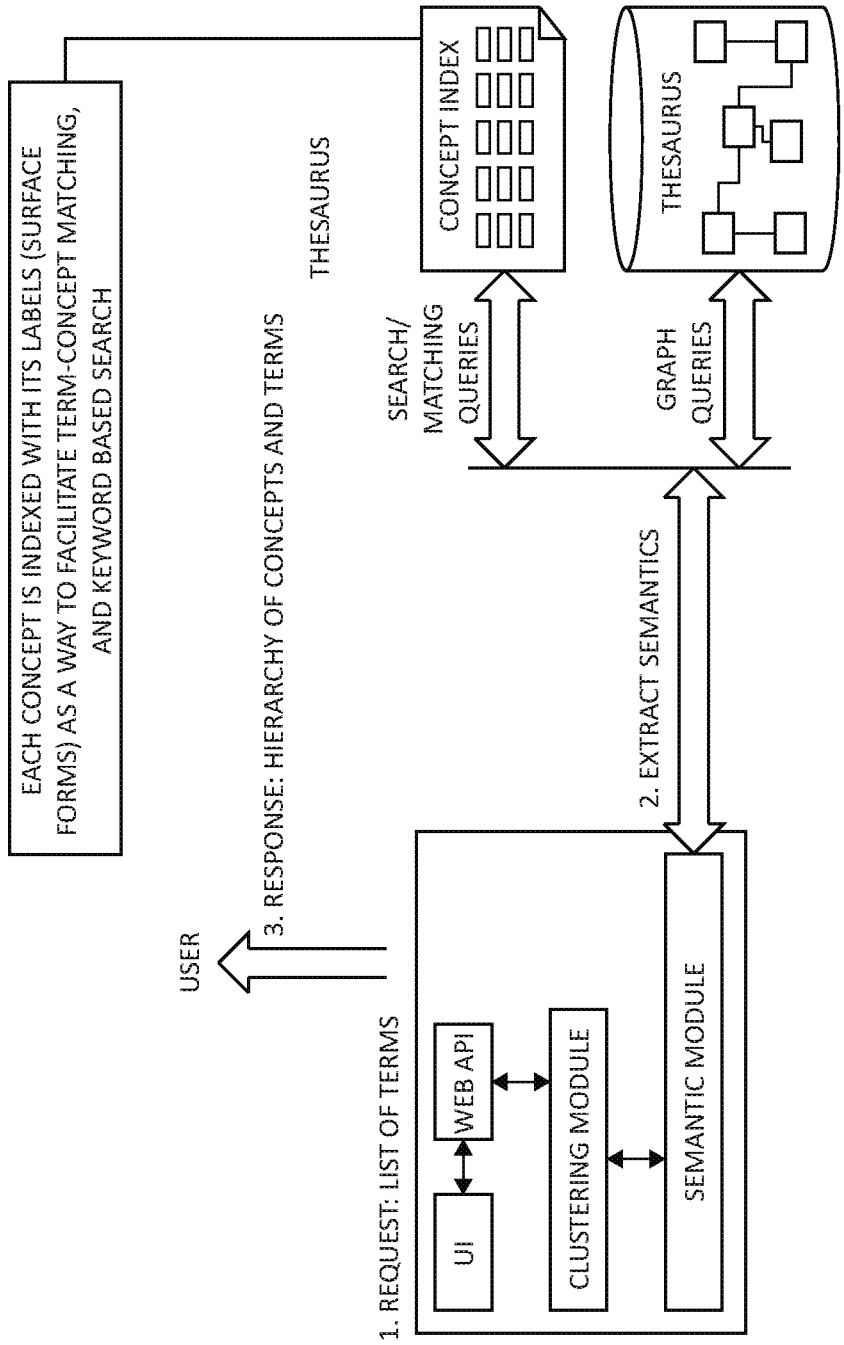
FIG. 7 is a diagram depicting an exemplary system architecture for semantic hierarchical grouping of text fragments in accordance with aspects of the present invention.

Turning now to FIG. 7, a diagram of exemplary system 700 for semantic hierarchical grouping of text fragments is depicted according to various aspects of the present invention. As shown, the various blocks of functionality are depicted with arrows designating the blocks' relationships with each other and to show process flow. Additionally, descriptive information is also seen relating each of the functional blocks. As will be seen, many of the functional blocks may also be considered "modules" of functionality. With the foregoing in mind, the module blocks 700 may also be incorporated into various hardware and software components of a system in accordance with the present invention. Many of the functional blocks may execute as background processes or services on various components, either in distributed computing components, or on the user device, or elsewhere.

Starting with a user, a user may input manually or programmatically a list of text fragments into a user interface (UI) that is in communication with a web application programming interface (API). The text fragments may for instance be the output of some information extraction task but need not be. The web API exposes the functionality of the semantic clustering module, which may issue API calls to the semantic module to extract semantics relating to the list of input text fragments and their sub-terms from the concept index and the thesaurus. The concept index may be searched according to a search query to identify and match concepts and sub-terms according to a similarity measure. The thesaurus may be queried to extract semantic relationships between concepts and/or semantic types. In one aspect, each concept in the concept index may be indexed with one or more semantic labels (a.k.a. surface forms) to facilitate term-concept matching (e.g., matching terms to concepts) and also for a keyword based search operation. The extracted semantics relating to the list of terms may be returned to the semantic module and returned to the user via the web API and UI. The clustering module may organize the sub-terms into a lexical sub-term hierarchy based on an ontology of concepts representing a domain knowledge for searching matching concepts according to the thesaurus and/or concept index (which may be an ontology). Also, the sub-terms may be organized by the clustering module into a hierarchy of concepts based on sub-term to concept matches, the lexical hierarchical relationships, and the semantic relationships between the concepts. In short, the system 700 may 1) request a list of terms, 2) extract semantics, and 3) provide a response with a hierarchy of concepts and terms.

Figure 8:
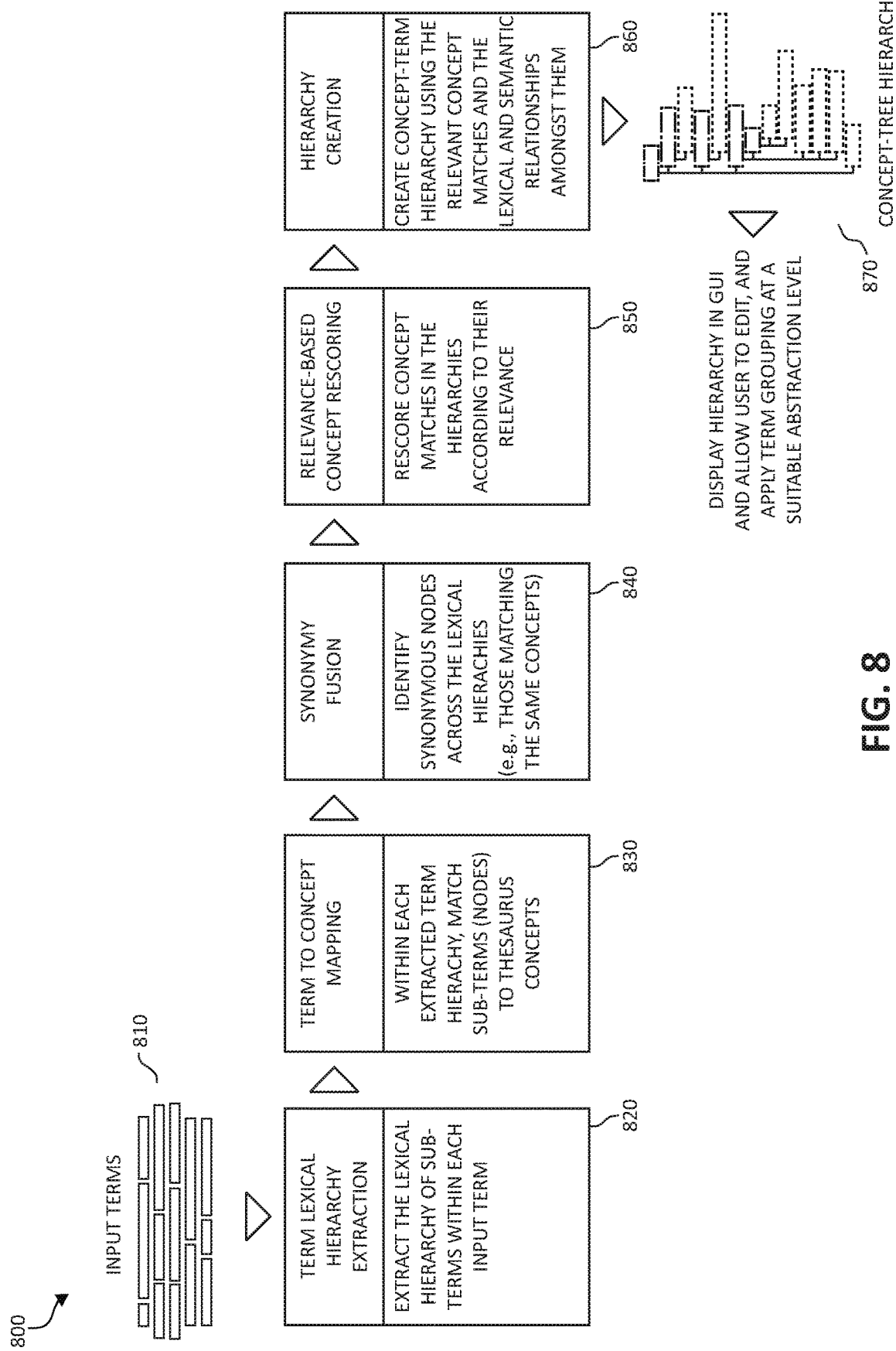
FIG. 8 is a flowchart diagram depicting an exemplary method for semantic hierarchical grouping of text fragments with matching concepts by a processor, in which aspects of the present invention may be realized.

With the foregoing functional components 700 in view, consider some of the various aspects of the illustrated embodiments. Turning now to FIG. 8, a flow chart diagram depicting an exemplary method 800 for semantic hierarchical grouping of text fragments by a processor is depicted. The functionality 800 may be implemented as a method executed as instructions on a machine, where the instructions are included on at least one computer readable medium or one non-transitory machine-readable storage medium. Starting in block 810, one or more input text fragments may be received. A lexical hierarchy extraction of the input terms may occur, as in block 820. A term-to-concept matching may be performed by matching, within each extracted term hierarchy graph, sub-terms (e.g., nodes) to thesaurus concepts, as in block 830. A synonymy fusion may also be executed in block 840. The synonymy fusion may include identifying synonymous nodes across all the lexical hierarchies (e.g., those sub-terms matching the same concepts). A relevance-based concept rescoring may occur by rescoring concept matches in the lexical hierarchy according for instance to a degree of relevance, as in block 850. A hierarchy of concepts matched with terms or sub-terms may be created using the relevant concept matches and the lexical and semantic relationship between the concepts matched with terms or sub-terms, as in block 860. The hierarchy of concepts may be displayed via a user interface (e.g., graphical user interface, GUI) to enable a user to edit, correct, adjust, validate, and/or apply term grouping at a suitable abstraction level, as in block 870.

Consider the following example of an implementation of the aforementioned functionality.

Lexical Hierarchy Extraction

Figure 9:
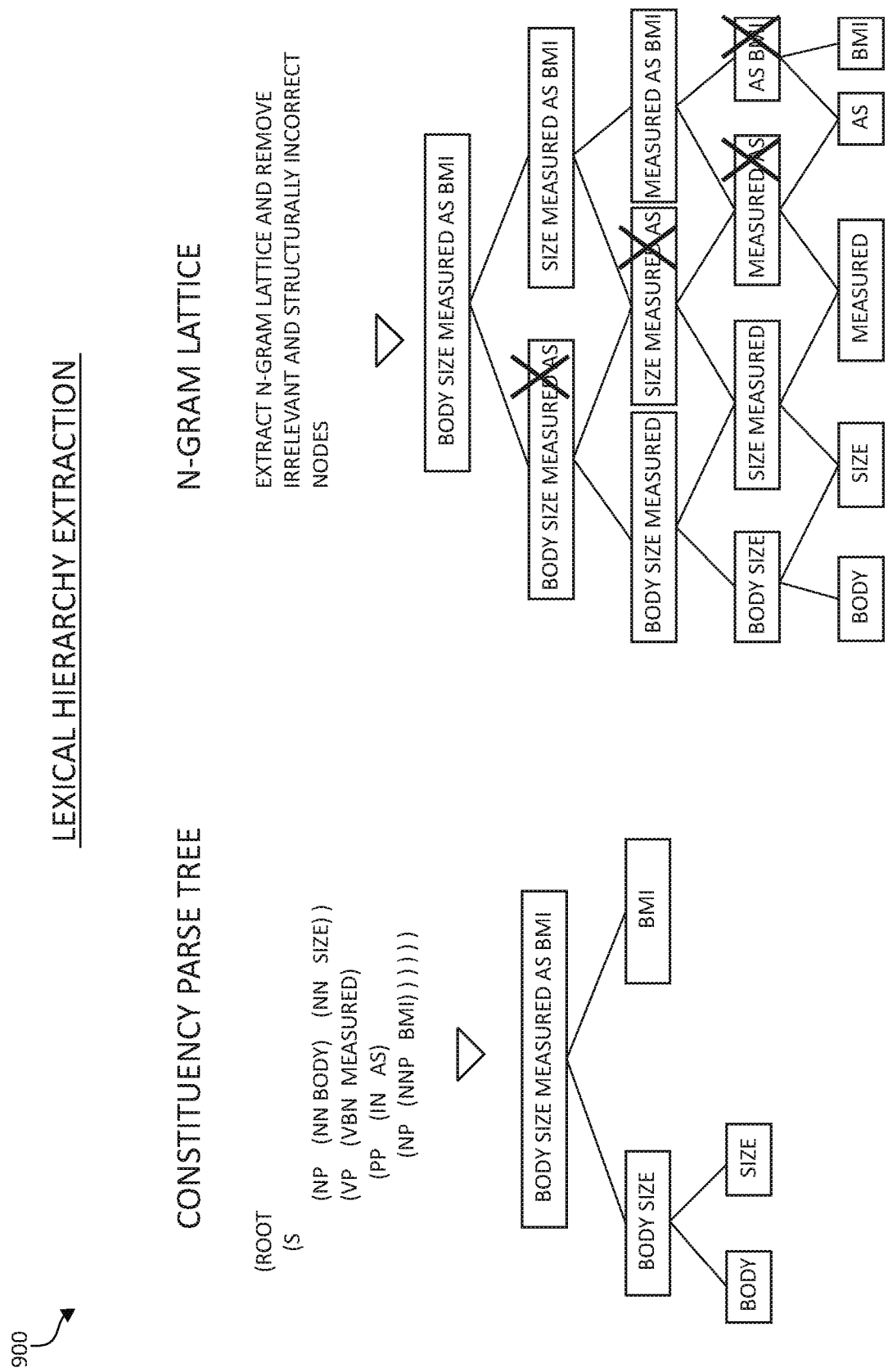
FIG. 9 is a diagram depicting an exemplary lexical sub-term hierarchy extraction in accordance with aspects of the present invention.

A lexical hierarchy of sub-terms within each input text fragment may be extracted as depicted in FIG. 9, 900. For each text fragment, the relevant sub-terms are extracted and organised according to their lexical hierarchy using a variety of possible techniques, for example relying on the output of a constituency parse tree and/or leveraging an n-gram lattice.

In one aspect, the n-gram lattice can be considered to create a compact representation of relevant and structurally correct nodes in a lexical hierarchy of sub-terms. The n-gram lattice may include removing irrelevant and structurally incorrect nodes. As depicted, "body size measured as BMI" is the root node of the n-gram lattice with "body size measured as" structurally incorrect and remove while "size measured as BMI" is relevant and structurally correct. In a similar fashion, "body size measured", "body size", "size measure", "body", "size", "measured", "measured as BMI", and "BMI" are each identified as relevant and structurally correct in the lexical hierarchy of the n-gram lattice. Alternatively, "size measured as", "measured as", and "as" are irrelevant and structurally incorrect and appropriately removed.

In relation to the constituency parse tree method, the mechanisms of the present embodiment are to compute the input text fragment's constituency parse tree, for example using a natural language processing (NLP) tool or application programming interface (API). Then, only those nodes that match a certain grammatical label may be retained (e.g., noun phrases and nouns, adjective phrases, etc.). In some embodiments, the grammatical portions of the input terms may be assigned according to the Penn Tree Bank scheme of grammatical labels. As depicted, by way of example only, "body size measured as BMI" is the root node of the tree with the noun phrases "body size" and "BMI" being nodes in a second tier. Noun phrases "Body" and "Size" are then nodes in the third tier of the constituency parse tree.

Term to Concept Matching

Turning now to FIG. 10, a diagram 1000 depicting an exemplary term to concept matching with an associated score is depicted. Upon creating the lexical term hierarchies, as depicted herein, each node in a lexical term hierarchy may be matched to thesaurus concepts using a concept index (e.g., ontology of concepts representing a domain knowledge). In one aspect, the matching may be based on surface terms (labels) associated with each concept, and which are already indexed. The matching may be performed in an exact match of the semantics of the concepts and terms and/or by use of a fuzzy match operation with matching scores should be provided. Also, a hierarchy of sub-term matching may be performed in a deep or shallow operation process (i.e., when a sub-term is matched, we may or may not continue matching the sub-nodes of the sub-term in question). Word sense disambiguation may be used to distinguish between different senses of the same term, and reliably determine the correct sense for the terms that are encountered. The word sense disambiguation may also be used to select the best matches or improve scoring, which may require considering a wider text window from which each fragment was extracted. Furthermore, a list of matching concepts may be filtered according to 1) semantic type where only concepts from a predefined set of semantic types to be considered, and/or 2) score where a concept matches below a certain absolute or relative threshold to be filtered out. The non-root nodes that do not match concepts may be removed.

Accordingly, matching the terms to concepts, a hierarchy of terms with their matching concepts and score may be created, which may have a form similar as depicted in FIG. 10. For example, as depicted in FIG. 10, the text may include an arbitrary value or identifier, such as "C0005901" for the text "body size" and a score of "[1]". In other words, the arbitrary value or score are depicted in FIG. 10 by way of example only and are not to be construed as limiting. In one aspect, scores do not need to be equal to the value 1 nor need they all be the same value. In short, a matching, relevant concept to a text fragment (e.g., sub-term or term itself) may be assigned a score. The arbitrary value or identifier can be used to identifying synonymy fusion.

Synonymy Fusion

Turning now to FIG. 11 is a diagram 1100 depicting synonymy fusion for semantic hierarchical grouping. Upon matching each text fragment to one or more matching concepts, synonymous nodes may be identified across all the lexical term hierarchies. That is, if there are two nodes in the same or different lexical term hierarchies, the two nodes may be considered synonymous if they share at least one matching concept. It should be noted that comparing scores may be used to identify the synonymous nodes, however, an overlap threshold may be considered too. Simply stated, the sub-terms at different nodes matching the same concepts may be considered as synonymous nodes. Hence, the arbitrary value may be assigned to assist with the identification of the synonymous node. Nevertheless, a semantic comparison between each node may also be performed for identifying the synonymous node. For each set of synonymous nodes, a virtual concept, that is the set of all the matching concepts may be created. Said differently, upon identifying the synonymous nodes between matching sub-terms in the lexical sub-term hierarchy, a virtual concept may be created where the created virtual concept includes each one of the sub-terms (e.g., nodes) having an identical matching concept. For example, as depicted in FIG. 11 "body mass index" (having concepts ID C0005893, C1305855, C2240399) is identified as a synonymous node with "BMI" (having concepts ID C0005893, C1305855, C1542867). Thus, a new virtual concept is created for "BMI" with new concepts ID (C0005893, C1305855, C2240399, and C1542867).

Relevance Based Concept Re-Scoring

Figure 12:
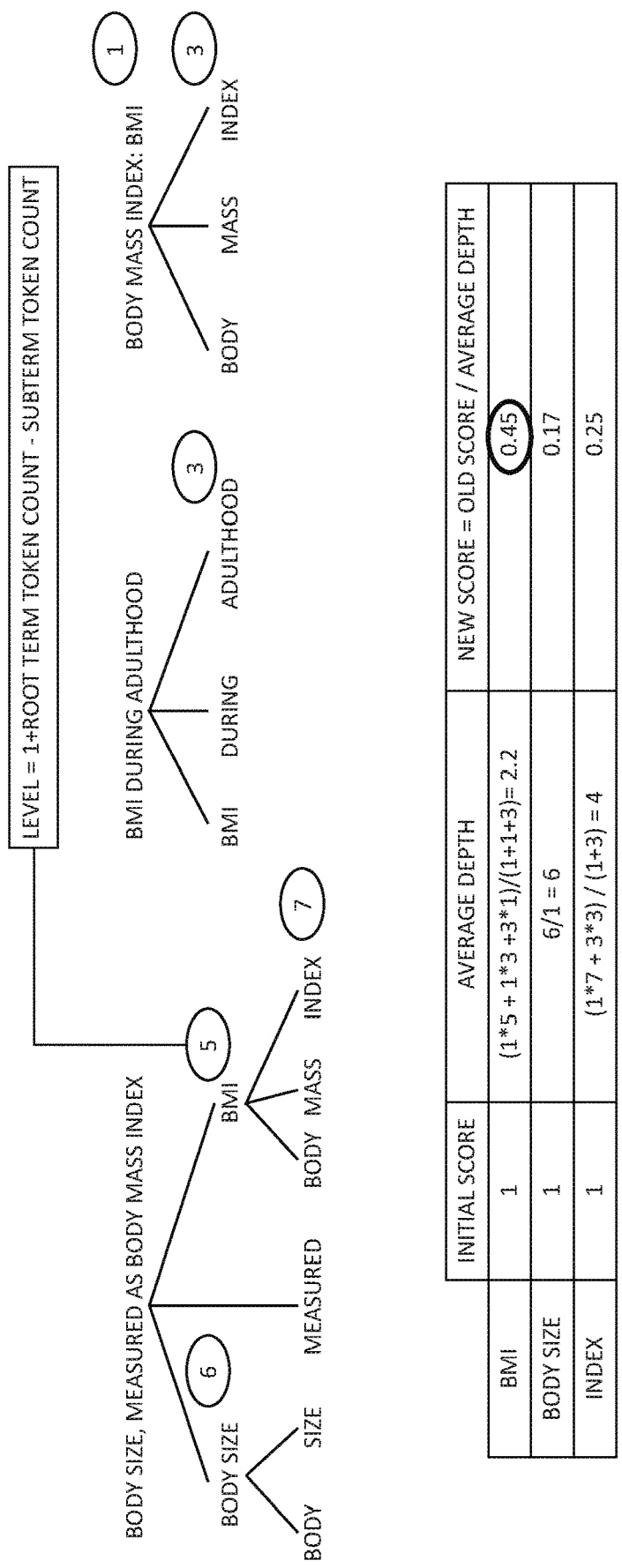
FIG. 12 is a diagram depicting an exemplary rescoring of concepts for semantic hierarchical grouping in accordance with aspects of the present invention.

Turning now to FIG. 12, a diagram 1200 depicting an exemplary rescoring of concepts for semantic hierarchical grouping is depicted. Once the lexical term hierarchies are mapped with matching concepts, with one or more virtual concepts, the concept matches may be rescored in all mapping hierarchies according to their degree of relevance, importance (e.g., a rank of importance or more specific and common concepts), or re-score according to syntactic constituent, such as the syntactic head as compared to the syntactic adnominal corpus of the concept). For example, as indicated in FIG. 12, the BMI, body size, and Index were each originally assigned an initial concept score of "1". An average depth calculation operation may be performed for each text term. The average depth calculation may be according to mathematical operations or functions that may involve one or more mathematical operations (e.g., using addition, subtraction, division, multiplication, standard deviations, means, averages, statistical modeling using statistical distributions, by finding minimums, maximums or similar thresholds for combined variables, etc.). For example, for each level, a one "1" can be added to an assigned root term token count and then subtracted from the sub-term token count (e.g., Level=1+root term token count−sub-term token count). Using the calculations of the average depth the BMI is assigned a new score which may be the old score divided by the average score. Accordingly, the BMI rescored concept score is 0.45. The Body Size rescored concept score is 0.17. The Index rescored concept score is 0.25. In this example, the rescoring enables to rate "BMI" higher in terms of relevance to the specific usage compared to the two sub-terms ("Index" and "Body Size").

Concept Hierarchy Creation

Figure 13:
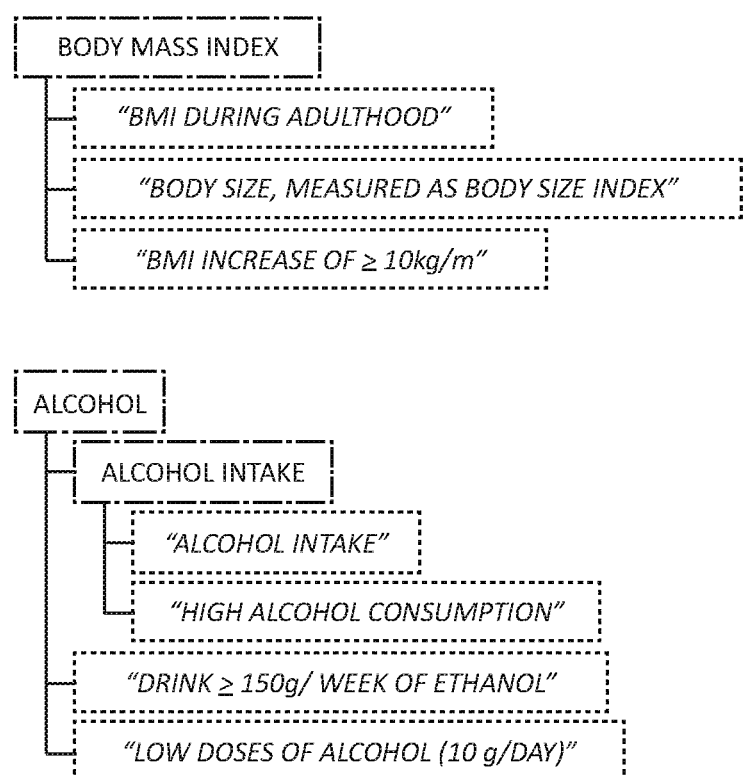
FIG. 13 is a diagram depicting an exemplary of hierarchy of concepts in accordance with aspects of the present invention.

Turning now to FIG. 13, a diagram depicting an exemplary creation of hierarchy of concepts and terms 1300. Upon rescoring of concepts for semantic hierarchical grouping, the hierarchy of concepts and term 1300 may be created. In one aspect, for each term to concept matching or mapping hierarchy, the concept having a large score may be the concept associated with the input term. That is, the concept having a highest concept rescore as compared to other concepts having a lower concept rescore may be selected for matching with the sub-terms for automatically grouping the sub-terms into the hierarchy of concepts. Taking into consideration both broader and even narrower lexical or semantic relationships of the sub-terms with the broader and even narrower lexical or semantic relationships of the concepts (from the thesaurus), the hierarchy of concepts and terms 1300 may be created.

User Interface

Figure 14:
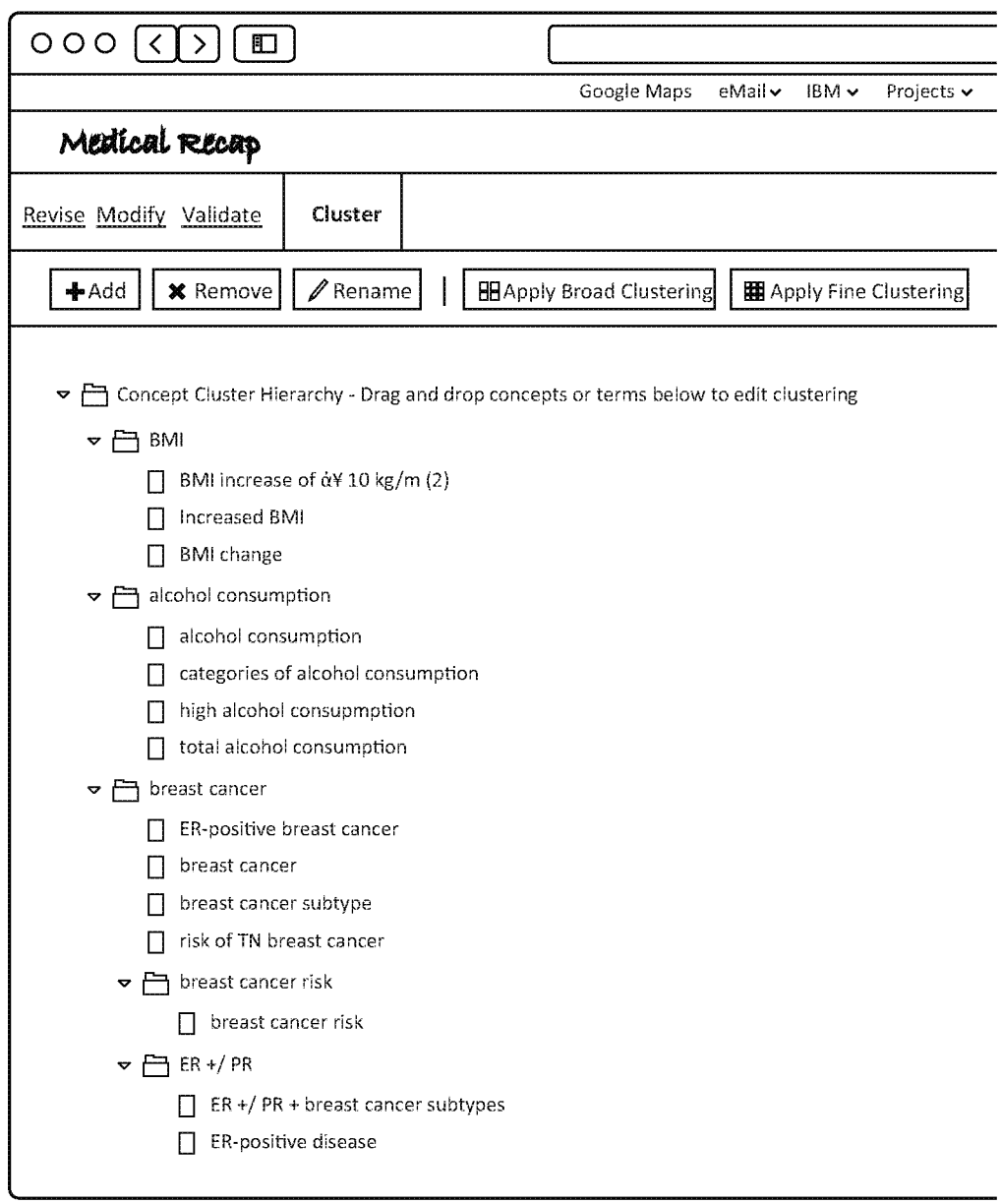
FIG. 14 is a diagram depicting an exemplary (graphical) user interface for validating the hierarchy of concepts in accordance with aspects of the present invention.

FIG. 14 illustrates a diagram depicting an exemplary user interface 1400 for validating the hierarchy of concepts. The user interface 1400 may be a graphical user interface (GUI) that may enable a user to edit, correct, rearrange, validate, and/or adjust either the concepts and/or terms of the hierarchy of concepts. The user interface 1400 may enable users to apply a clustering approach based on the defined hierarchy and to specify a suitable level of abstraction (whether to use the root leaves only or a deeper level) according to user preference. In one aspect, the user interface 1400 may be graphical (preferably), programmatic, or textual. User feedback (e.g., the corrections, edits, adjustments, and the like) may be identified, analysed, and/or stored so as to more accurately identify relevant concepts that are to match input terms to include in the hierarchy of concepts.

Figure 15:
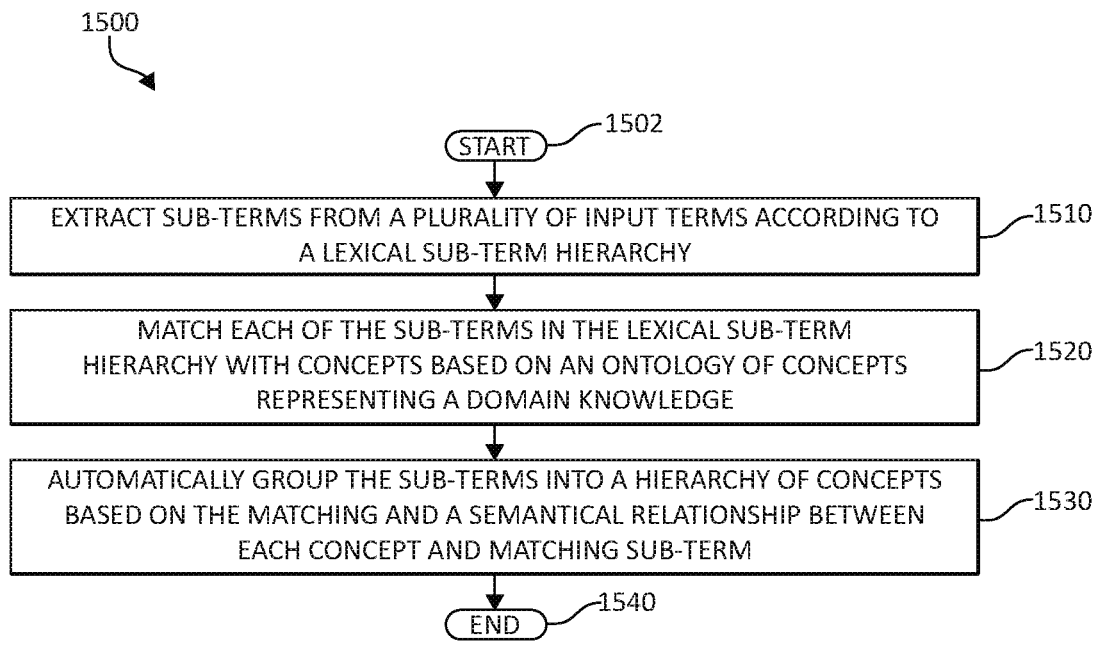
FIG. 15 is a flowchart diagram depicting an exemplary method for semantic hierarchical grouping of text fragments by a processor; again in which aspects of the present invention may be realized.

Turning now to FIG. 15, a method 1500 for semantic hierarchical grouping of text fragments by a processor is depicted, in which various aspects of the illustrated embodiments may be implemented. That is, FIG. 15 is a flowchart of an additional example method 1500 for semantic hierarchical grouping of text fragments in a computing environment according to an example of the present invention. The functionality 1500 may be implemented as a method executed as instructions on a machine, where the instructions are included on at least one computer readable medium or one non-transitory machine-readable storage medium. The functionality 1500 may start in block 1502. In block 1510, sub-terms may be extracted from a plurality of input terms according to a lexical sub-term hierarchy. Each of the sub-terms in the lexical sub-term hierarchy may be matched with concepts based on an ontology of concepts representing a domain knowledge, as in block 1520. Eventually the input terms may be automatically grouped into a hierarchy of concepts based on the matching and a semantical relationship between each concept and matching sub-term, as in block 1530. The functionality 1500 may end in block 1540.

In one aspect, in conjunction with and/or as part of at least one block of FIG. 15, the operations of method 1500 may include each of the following. The operations of method 1500 may match each of the sub-terms in the lexical sub-term hierarchy with concepts based on an ontology of concepts representing a domain knowledge and/or automatically group the plurality of input text fragments into a hierarchy of concepts based on the matching, lexical sub-terms hierarchical relationships, and semantic relationships between matched concepts.

The operations of method 1500 may assign a concept score to each of the sub-terms matched with a concept. Synonymous nodes may be identified between matching sub-terms in the lexical sub-term hierarchies to create virtual concepts. The synonymous nodes include each one of the sub-terms sharing an identical matching concept. A concept may be matched to a sub-term using the concept's labels (surface forms) as defined in the ontology of concepts representing the domain knowledge.

The operations of method 1500 may identify synonymous nodes between matching sub-terms in lexical sub-term hierarchies to create a virtual concept, wherein the synonymous nodes include each one of the sub-terms sharing an identical matching concept. The operations of method 1500 may match semantic labels of a concept to a sub-term using the ontology of concepts representing the domain knowledge and/or filter the concepts for the matching step according to defined filtering criteria, the defined filtering criteria including at least filtering the concepts belonging to a predefined set of semantic types or those concepts having a concept score above a defined threshold.

In one aspect, a concept score may be assigned to each of the sub-terms matched with a concept. The concepts for matching to input terms or sub-terms may be filtered according to either the concepts belonging to a predefined set of semantic types or those concepts having a concept score above a defined threshold. A concept score may be rescored according to either an average depth of the concepts within the lexical sub-term hierarchy or a degree of relevance between the concepts. The concepts may be selected according to a highest concept rescore as compared to other concepts having a lower concept rescore for automatically grouping the input terms into the hierarchy of concepts. In one aspect, the concepts may be selected according to a highest concept rescore as compared to other concepts having a lower concept rescore for automatically grouping the sub-terms into the hierarchy of concepts. An output of the hierarchy of concepts may be review, modified, and/or validated via a user interface. One or more instructions may be received via the user interface (by a user) for using the output of the hierarchy of concepts for a clustering operation. In other words, the operations of method 1500 may include validating an output of the hierarchy of concepts via a user interface, modifying the output of the hierarch of concepts by one of moving one or more nodes of the hierarchy of concepts, deleting one or more nodes of the hierarchy of concepts, or renaming one or more of the concepts, and/or receiving instruction via the user interface for using the output of the hierarchy of concepts for a clustering operation.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method, by a processor, for semantic hierarchical grouping of text fragments, comprising:
    extracting sub-terms from a plurality of input text fragments according to a lexical sub-term hierarchy;
    matching each of the sub-terms in the lexical sub-term hierarchy with concepts based on an ontology of concepts representing a domain knowledge; wherein the matching further includes assigning a concept score, at a first time, to each of the sub-terms matched with a respective concept, and identifying synonymous nodes between matching sub-terms within differing levels of the lexical sub-term hierarchy to create a virtual concept, wherein the virtual concept comprises the synonymous nodes which include each one of the sub-terms sharing an identical matching concept, the virtual concept including an alphanumeric concept identifier aggregated from each of a plurality of arbitrary alphanumeric concept identifiers, incorporating the concept score, associated with the respective sub-terms sharing the identical matching concept;
    responsive to matching each of the sub-terms in the lexical sub-term hierarchy with the concepts and creating the virtual concept incorporating the sub-terms sharing the identical matching concept, re-scoring, at a second time, the concept score according to an average depth of the concepts within the lexical sub-term hierarchy; wherein, for each level of the lexical sub-term hierarchy, the re-scoring adds a predetermined value to an assigned root term token count and subtracts the predetermined value from a sub-term token count to determine the average depth;
    automatically grouping the plurality of input text fragments into a hierarchy of concepts based on the matching, lexical sub-terms hierarchical relationships, and semantic relationships between matched concepts;
    validating, by input from a user received through a user interface, an output of the hierarchy of concepts presented via the user interface;
    upon receiving input from the user that the hierarchy of concepts in invalid, modifying the output of the hierarchy of concepts by one of: moving one or more nodes of the hierarchy of concepts, deleting one or more nodes of the hierarchy of concepts, or renaming one or more of the concepts; and
    presenting instructions to the user via the user interface for using the output of the hierarchy of concepts for a clustering operation.

2. The method of claim 1, wherein the matching further includes
    selecting the concepts according to a highest concept score as compared to other concepts having a lower concept score for automatically grouping the plurality of input text fragments into the hierarchy of concepts.

3. The method of claim 1, wherein the matching further includes matching semantic labels of the respective concept to one of the sub-terms using the ontology of concepts representing the domain knowledge.

4. The method of claim 1, wherein the matching further includes filtering the concepts for the matching step according to defined filtering criteria, the defined filtering criteria including at least filtering the concepts belonging to a predefined set of semantic types or those concepts having a concept score above a defined threshold.

5. The method of claim 2, further including
    selecting the concepts according to a highest concept rescore as compared to other concepts having a lower concept rescore for automatically grouping the input text fragments into the hierarchy of concepts.

6. A system for assigning tasks to a robot device, comprising:
    one or more computers with executable instructions that when executed cause the system to:
        extract sub-terms from a plurality of input text fragments according to a lexical sub-term hierarchy;
        match each of the sub-terms in the lexical sub-term hierarchy with concepts based on an ontology of concepts representing a domain knowledge; wherein the matching further includes assigning a concept score, at a first time, to each of the sub-terms matched with a respective concept, and identifying synonymous nodes between matching sub-terms within differing levels of the lexical sub-term hierarchy to create a virtual concept, wherein the virtual concept comprises the synonymous nodes which include each one of the sub-terms sharing an identical matching concept, the virtual concept including an alphanumeric concept identifier aggregated from each of a plurality of arbitrary alphanumeric concept identifiers, incorporating the concept score, associated with the respective sub-terms sharing the identical matching concept;
        responsive to matching each of the sub-terms in the lexical sub-term hierarchy with the concepts and creating the virtual concept incorporating the sub-terms sharing the identical matching concept, re-score, at a second time, the concept score according to an average depth of the concepts within the lexical sub-term hierarchy; wherein, for each level of the lexical sub-term hierarchy, the re-scoring adds a predetermined value to an assigned root term token count and subtracts the predetermined value from a sub-term token count to determine the average depth;
        automatically group the plurality of input text fragments into a hierarchy of concepts based on the matching, lexical sub-terms hierarchical relationships, and semantic relationships between matched concepts;
        validate, by input from a user received through a user interface, an output of the hierarchy of concepts presented via the user interface;

upon receiving input from the user that the hierarchy of concepts in invalid, modify the output of the hierarchy of concepts by one of: moving one or more nodes of the hierarchy of concepts, deleting one or more nodes of the hierarchy of concepts, or renaming one or more of the concepts; and present instructions to the user via the user interface for using the output of the hierarchy of concepts for a clustering operation.

7. The system of claim 6, wherein the executable instructions select the concepts according to a highest concept score as compared to other concepts having a lower concept score for automatically grouping the plurality of input text fragments into the hierarchy of concepts.

8. The system of claim 6, wherein the matching further includes matching semantic labels of the respective concept to one of the sub-terms using the ontology of concepts representing the domain knowledge.

9. The system of claim 6, wherein the matching further includes filtering the concepts for the matching step according to defined filtering criteria, the defined filtering criteria including at least filtering the concepts belonging to a predefined set of semantic types or those concepts having a concept score above a defined threshold.

10. The system of claim 7, wherein the executable instructions select the concepts according to a highest concept rescore as compared to other concepts having a lower concept rescore for automatically grouping the input text fragments into the hierarchy of concepts.

11. A computer program product for, by a processor, facilitating recording images to improve quality, the computer program product comprising a non-transitory computer-readable storage medium having computer-readable program code portions stored therein, the computer-readable program code portions comprising:

an executable portion that extracts sub-terms from a plurality of input text fragments according to a lexical sub-term hierarchy;

an executable portion that matches each of the sub-terms in the lexical sub-term hierarchy with concepts based on an ontology of concepts representing a domain knowledge; wherein the matching further includes assigning a concept score, at a first time, to each of the sub-terms matched with a respective concept, and identifying synonymous nodes between matching sub-terms within differing levels of the lexical sub-term hierarchy to create a virtual concept, wherein the virtual concept comprises the synonymous nodes which include each one of the sub-terms sharing an identical matching concept, the virtual concept including an alphanumeric concept identifier aggregated from each of a plurality of arbitrary alphanumeric concept identifiers, incorporating the concept score, associated with the respective sub-terms sharing the identical matching concept;

an executable portion that, responsive to matching each of the sub-terms in the lexical sub-term hierarchy with the concepts and creating the virtual concept incorporating the sub-terms sharing the identical matching concept, re-scores, at a second time, the concept score according to an average depth of the concepts within the lexical sub-term hierarchy; wherein, for each level of the lexical sub-term hierarchy, the re-scoring adds a predetermined value to an assigned root term token count and subtracts the predetermined value from a sub-term token count to determine the average depth;

an executable portion that automatically groups the plurality of input text fragments into a hierarchy of concepts based on the matching, lexical sub-terms hierarchical relationships, and semantic relationships between matched concepts;

an executable portion that validates, by input from a user received through a user interface, an output of the hierarchy of concepts presented via the user interface;

an executable portion that, upon receiving input from the user that the hierarchy of concepts in invalid, modifies the output of the hierarchy of concepts by one of: moving one or more nodes of the hierarchy of concepts, deleting one or more nodes of the hierarchy of concepts, or renaming one or more of the concepts; and an executable portion that presents instructions to the user via the user interface for using the output of the hierarchy of concepts for a clustering operation.

12. The computer program product of claim 11, further including an executable portion that selects the concepts according to a highest concept score as compared to other concepts having a lower concept score for automatically grouping the plurality of input text fragments into the hierarchy of concepts.

13. The computer program product of claim 11, further including an executable portion that matches semantic labels of the respective concept to one of the sub-terms using the ontology of concepts representing the domain knowledge.

14. The computer program product of claim 11, further including an executable portion that filters the concepts for the matching step according to defined filtering criteria, the defined filtering criteria including at least filtering the concepts belonging to a predefined set of semantic types or those concepts having a concept score above a defined threshold.

15. The computer program product of claim 12, further including an executable portion that selects the concepts according to a highest concept rescore as compared to other concepts having a lower concept rescore for automatically grouping the input text fragments into the hierarchy of concepts.

* * * * *